(12) United States Patent
Kikuchi

(10) Patent No.: US 8,379,124 B2
(45) Date of Patent: Feb. 19, 2013

(54) SOLID-STATE IMAGING APPARATUS WITH SWITCHED CAPACITORS

(75) Inventor: Shin Kikuchi, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 12/819,389

(22) Filed: Jun. 21, 2010

(65) Prior Publication Data

US 2011/0032404 A1    Feb. 10, 2011

(30) Foreign Application Priority Data

Aug. 4, 2009  (JP) ................................. 2009-181784

(51) Int. Cl.
*H04N 3/14*    (2006.01)
(52) U.S. Cl. ......... 348/300; 348/294; 348/308; 348/301
(58) Field of Classification Search ................... 348/241, 348/220.1, 221.1, 229.1, 243, 248, 300, 301
See application file for complete search history.

(56) References Cited

U.S. PATENT DOCUMENTS

| | | | |
|---|---|---|---|
| 7,321,110 B2 | 1/2008 | Okita et al. ................ 250/208.1 |
| 7,408,210 B2 | 8/2008 | Ogura et al. .................... 257/233 |
| 7,456,888 B2 | 11/2008 | Kikuchi .......................... 348/308 |
| 7,460,162 B2 | 12/2008 | Koizumi et al. .............. 348/294 |
| 7,550,793 B2 | 6/2009 | Itano et al. ..................... 257/239 |
| 7,554,591 B2 | 6/2009 | Kikuchi et al. ............... 348/308 |
| 8,077,239 B2* | 12/2011 | Inoue et al. .................... 348/300 |
| 2002/0134918 A1* | 9/2002 | Miida .......................... 250/214.1 |
| 2005/0168602 A1 | 8/2005 | Sumi et al. ..................... 348/294 |
| 2005/0179795 A1* | 8/2005 | Funatsu et al. ................ 348/302 |
| 2009/0073298 A1 | 3/2009 | Ogura et al. .................. 348/308 |
| 2009/0303364 A1 | 12/2009 | Shibata et al. ................ 348/302 |
| 2009/0310001 A1* | 12/2009 | Masuyama et al. ........... 348/300 |
| 2009/0322903 A1* | 12/2009 | Hashimoto et al. ........ 348/229.1 |
| 2010/0002114 A1 | 1/2010 | Ogura et al. ................... 348/301 |
| 2010/0194621 A1* | 8/2010 | Mizoguchi et al. ........... 341/172 |

FOREIGN PATENT DOCUMENTS

JP    2005-175517 A    6/2005

* cited by examiner

*Primary Examiner* — Tuan Ho
*Assistant Examiner* — Selam Gebriel
(74) *Attorney, Agent, or Firm* — Fitzpatrick, Cella, Harper & Scinto

(57) ABSTRACT

A solid-state imaging apparatus includes a pixel outputting a pixel signal; and an amplifier for amplifying the pixel signal. The amplifier includes an input capacitor connected between an input terminal of the operational amplifier and the pixel, a feedback capacitor connected between the input and output terminals of the amplifier, an initializing switch connected between the input terminal and the output terminal of the amplifier, a first capacitor connected in parallel to the feedback capacitor, a second capacitor connected in parallel to the feedback capacitor, a first switch connected between an one terminal of the feedback capacitor and an one terminal of the first capacitor, and a second switch connected between the one terminal of the first capacitor and an one terminal of the second capacitor. One terminal of the first or second capacitor is connected to the one terminal of the second capacitor through the first and second switches.

8 Claims, 7 Drawing Sheets

SOLID-STATE IMAGING APPARATUS WITH SWITCHED CAPACITORS

BACKGROUND OF THE INVENTION

1. Field of the Invention

The present invention relates to a solid-state imaging apparatus.

2. Description of the Related Art

In a solid-state imaging apparatus, such as a CMOS sensor, in which pixels provided with a photoelectric conversion element are arrayed one-dimensionally or two-dimensionally and voltage outputs from the pixels are read by circuits provided on a column-by-column basis, an S/N ratio can be improved by amplifying voltage using the column-by-column read circuits.

It is important in terms of the S/N ratio that an amplifier (hereinafter referred to as a column amplifier) provided for each read circuit to amplify voltage will perform the amplification without compromising dynamic ranges of output signals from the photoelectric conversion elements. Also, in imaging of a very low-luminance object, the S/N ratio can be improved by amplifying signals using the column amplifier.

In an image sensing system, generally an amplifying ratio of the column amplifier is varied according to illuminance of the object. A column amplifier circuit with a variable amplifying ratio is disclosed in Japanese Patent Application Laid-Open No. 2005-175517.

However, with the technique disclosed in Japanese Patent Application Laid-Open No. 2005-175517, parasitic capacitance becomes non-negligible with decreases in pixel pitch, resulting in an error: a desired amplifying ratio is not available especially at high gain settings. The solid-state imaging apparatus has the following three problems.

(1) To compensate for decrease in the amplifying ratio caused by the parasitic capacitance, size of an input capacitor needs to be increased, resulting in an increased chip area.

(2) Capacitance between wires and capacitance between switch terminals, which can cause parasitic capacitance, are affected by manufacturing variations such as variations in film thickness of insulating films and film thickness of metal wiring layers, and thus the amplifying ratio is also subject to the manufacturing variations.

(3) Disturbance is liable to get introduced via parasitic capacitance and is noticeable especially at high amplifying ratios.

SUMMARY OF THE INVENTION

An object of the present invention is to provide a solid-state imaging apparatus which can prevent fluctuations (decreases) in an amplifying ratio of an amplifier due to parasitic capacitance.

A solid-state imaging apparatus according to one aspect of the present invention comprises: a pixel including a photoelectric conversion element and outputting a pixel signal; and an amplifier for amplifying the pixel signal outputted from the pixel, wherein the amplifier includes an operational amplifier, an input capacitor having one terminal connected to an input terminal of the operational amplifier and the other terminal connected to the pixel, a feedback capacitor connected between the input terminal and an output terminal of the operational amplifier, an initialization switch connected between the input terminal and the output terminal of the operational amplifier, a first capacitor connected in parallel to the input capacitor having one terminal connected to the one terminal of the input capacitor and the other terminal connected to the other terminal of the input capacitor, a second capacitor connected in parallel to the input capacitor having one terminal connected to the one terminal of the input capacitor and the other terminal connected to the other terminal of the input capacitor, a first switch and a second switch, wherein the first switch is arranged between the one terminals of the input capacitor and the first capacitor, and the second switch is arranged between the one terminals of the first and second capacitors, or the first switch is arranged between the other terminals of the input capacitor and the first capacitor, and the second switch is arranged between the other terminals of the first and second capacitors.

A solid-state imaging apparatus according to a further aspect of the present invention comprises: a pixel including a photoelectric conversion element and outputting a pixel signal; and an amplifier for amplifying the pixel signal outputted from the pixel, wherein the amplifier includes an operational amplifier, an input capacitor having one terminal connected to an input terminal of the operational amplifier and the other terminal connected to the pixel, a feedback capacitor connected between the input terminal and an output terminal of the operational amplifier, an initialization switch connected between the input terminal and the output terminal of the operational amplifier, a first capacitor connected in parallel to the feedback capacitor having one terminal connected to the one terminal of the feedback capacitor and the other terminal connected to the other terminal of the feedback capacitor, a second capacitor connected in parallel to the feedback capacitor having one terminal connected to the one terminal of the feedback capacitor and the other terminal connected to the other terminal of the feedback capacitor, a first switch and a second switch wherein the first switch is arranged between the one terminals of the feedback capacitor and the first capacitor, and the second switch is arranged between the one terminals of the first and second capacitors, or, the first switch is arranged between the other terminals of the feedback capacitor and the first capacitor, and the second switch is arranged between the other terminals of the first and second capacitors.

The present invention can prevent fluctuations (decreases) in the amplifying ratio of an amplifier due to parasitic capacitance.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(First Embodiment)

Figure 1:
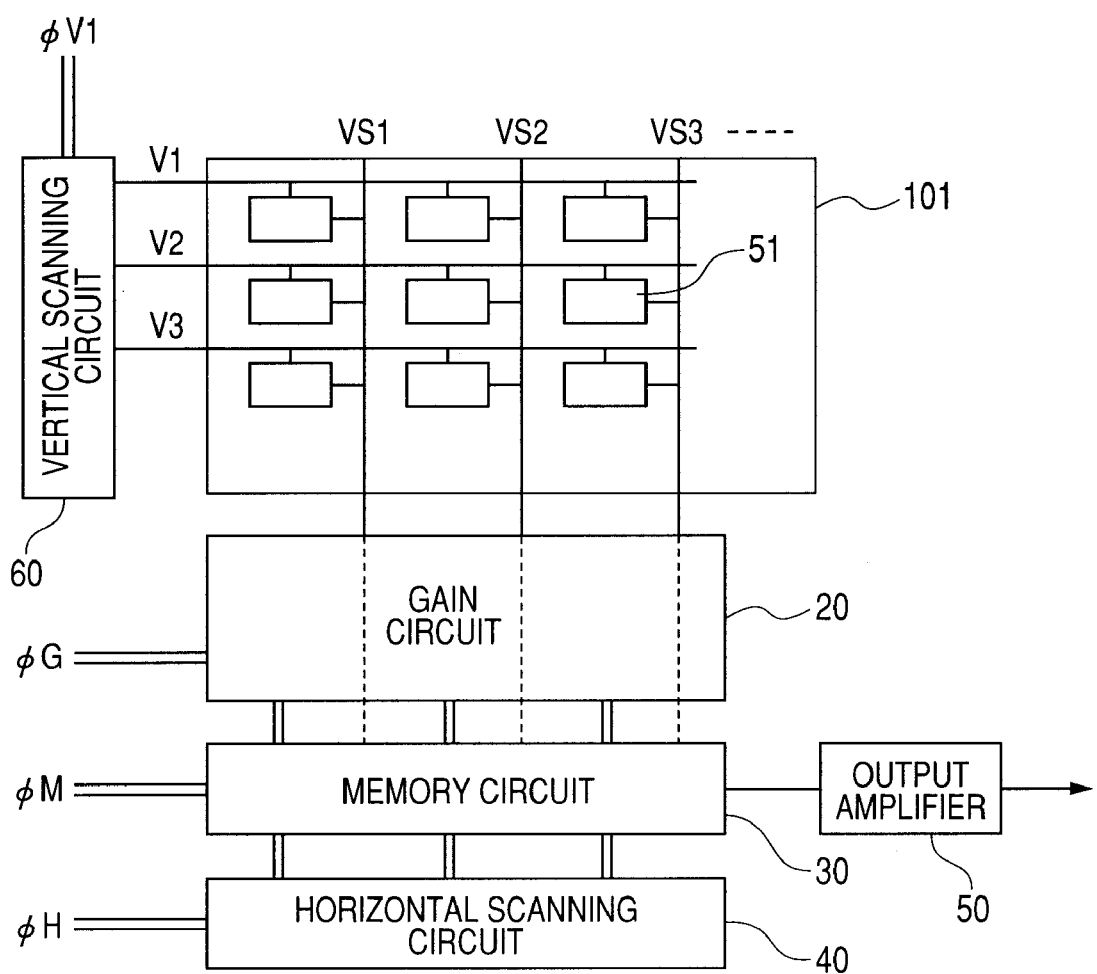
FIG. 1 is a diagram illustrating a configuration example of a solid-state imaging apparatus according to a first embodiment of the present invention.

FIG. 1 is a diagram illustrating a configuration example of a solid-state imaging apparatus according to a first embodiment of the present invention. Components in FIG. 1 are installed on a single semiconductor substrate. A pixel unit 101 includes multiple pixels 51 arranged in a two-dimensional array, where each of the pixels 51 has a voltage outputting type photoelectric conversion element such as a CMOS sensor. The pixels 51 in the same row are commonly connected to a control line V1, V2, . . . , or Vn. By receiving signals from a vertical scanning circuit 60, the pixels 51 output pixel signals to respective vertical signal lines VS1, VS2, . . . , and VSn simultaneously. A gain circuit 20 includes variable-gain amplifiers installed for the respective vertical signal lines VS1, VS2, . . . , and VSn and amplifies pixel signals output to the vertical signal lines VS1, VS2, . . . , and VSn. Amplifying ratios of the amplifiers are set by a signal φG which is an external gain control signal. A memory circuit 30 which includes memories installed for the respective amplifiers of the gain circuit 20 temporarily holds the signals amplified by the amplifiers of the gain circuit 20. The memories in the memory circuits 30 are scanned in sequence by a horizontal scanning circuit 40 and results are output from the solid-state imaging apparatus via an output amplifier 50 which is an output unit. Signals φV1, φG, φM and φH shown in FIG. 1 are used to control driving of the respective circuits. Actually, some of the signals are made up of multiple signals, but are shown as being single signals for the sake of simplicity.

Figure 2:
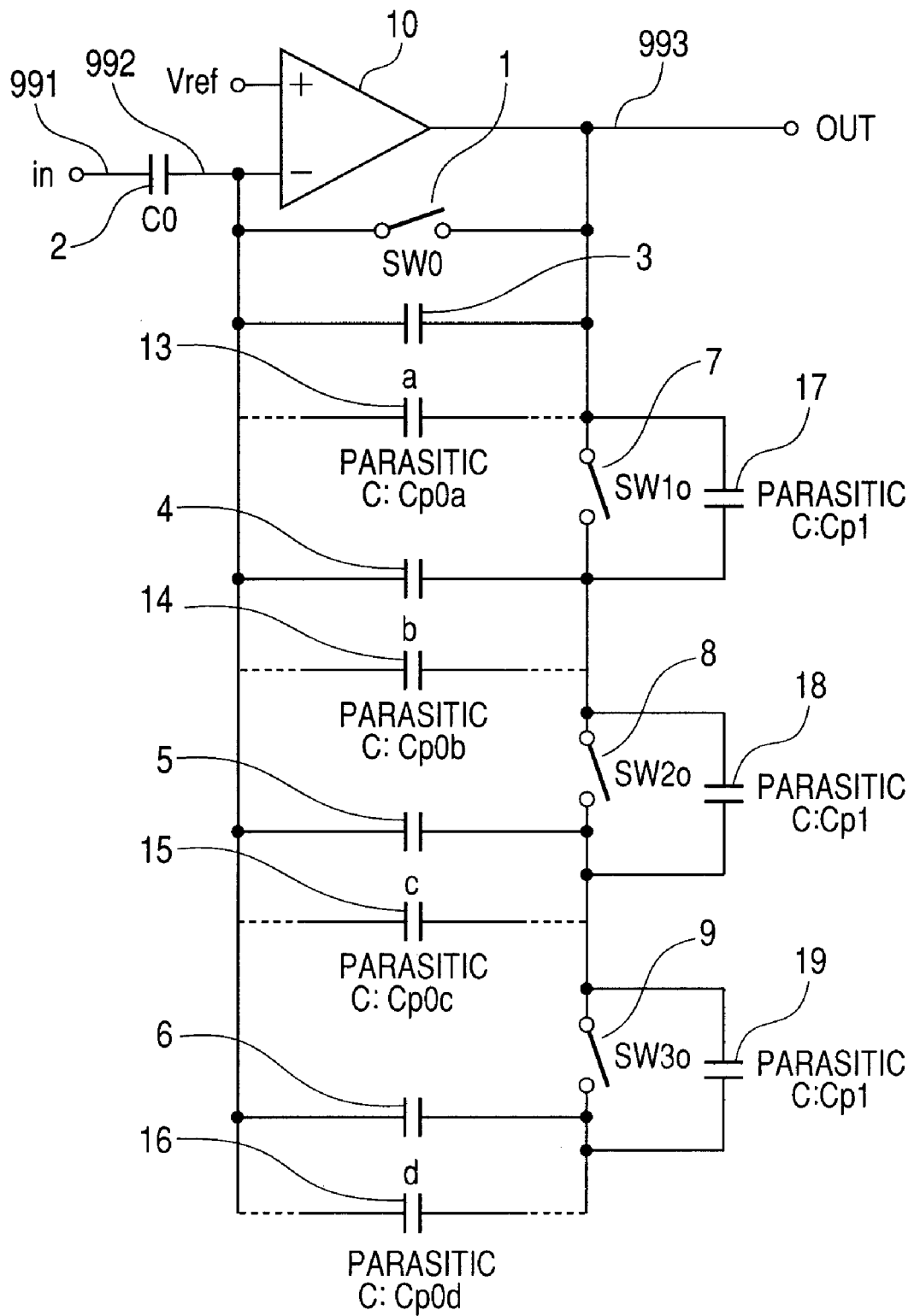
FIG. 2 is a circuit diagram illustrating a configuration example of an amplifier according to the first embodiment.

FIG. 2 is a circuit diagram illustrating a configuration example of an amplifier installed in each column of the gain circuit 20 according to the present embodiment. An initializing switch (SW0) 1 in FIG. 2 initializes feedback capacitors 3 to 6 upon activation. In FIG. 2, an input capacitor C0 is denoted by 2, feedback capacitor a is denoted by 3, feedback capacitor (first capacitor) b is denoted by 4, feedback capacitor (second capacitor) c is denoted by 5, and feedback capacitor (third capacitor) d is denoted by 6. The capacitors a, b, c and d have a relationship $a \leq b \leq c \leq d$. Furthermore, an amplifying ratio changing switch (first switch) SW1o is denoted by 7, second amplifying ratio changing switch (second switch) SW2o is denoted by 8, third amplifying ratio changing switch SW3o is denoted by 9, and operational amplifier is denoted by 10. The amplifying ratio changing switches 7, 8 and 9 are turned on and off by the gain control signal φG shown in FIG. 1. The amplifying ratio changing switches 7, 8 and 9 can cut off parasitic capacitance from an output line 993 and thereby reduce the parasitic capacitance.

Of the operational amplifier 10, a positive input terminal accepts input of a potential Vref, a negative input terminal 992 is connected to an input terminal in via the input capacitor 2, and an output terminal is connected to an output terminal OUT. The input terminal in is connected to the vertical signal lines VS1, VS2, . . . , and VSn in FIG. 1. The output terminal OUT is connected to the memory circuit 30 in FIG. 1. The input terminal in is denoted by 991 and output terminal OUT is denoted by 993. The initializing switch 1 is connected in parallel between the negative input terminal 992 and output terminal 993 of the operational amplifier 10. The feedback capacitors 3 to 6 are connected between the negative input terminal 992 and output terminal 993 of the operational amplifier 10. The amplifying ratio changing switch 7 is connected between right terminals (one terminals) of the feedback capacitors and 4. The amplifying ratio changing switch 8 is connected between right terminals of the feedback capacitors 4 and 5. The amplifying ratio changing switch 9 is connected between right terminals of the feedback capacitors 5 and 6. The right terminal of the feedback capacitor 3 is connected to the output terminal 993. The output terminal 993 of the operational amplifier 10 is connected to the right terminal of the feedback capacitor 5 via the amplifying ratio changing switches 7 and 8, and to the right terminal of the feedback capacitor 6 via the amplifying ratio changing switches 7, 8 and 9.

Now, an amplifying ratio will be determined by taking the parasitic capacitances into consideration. In FIG. 2, parasitic capacitance Cp0a of the feedback capacitor 3 is denoted by 13, parasitic capacitance Cp0b of the feedback capacitor 4 is denoted by 14, parasitic capacitance Cp0c of the feedback capacitor 5 is denoted by 15, and parasitic capacitance Cp0d of the feedback capacitor 6 is denoted by 16. Also, parasitic capacitance of the amplifying ratio changing switch 7, parasitic capacitance of the amplifying ratio changing switch 8, and parasitic capacitance of the amplifying ratio changing switch 9 are denoted by 17, 18 and 19, respectively, where it is assumed that all the parasitic capacitances have a capacitance value of Cp1.

When only the switch 7 is turned on, the value of the feedback capacitor becomes a+b, reducing the amplifying ratio. When the switch 8 is turned on further, the value of the feedback capacitor becomes a+b+c, further reducing the amplifying ratio. When the switch 9 is turned on further, the amplifying ratio can be set to a minimum value. Even if the switches 8 and 9 are turned on with the switch turned off, the amplifying ratio cannot be changed. Similarly, even if the switch 9 is turned on with the switch 8 turned off, the amplifying ratio cannot be changed. That is, when the switches 7 to 9 are operated in combination, it is always necessary to turn on the switches 7, 8 and 9 in this order. Therefore, the amplifying ratio has four settings. Specifically, the amplifying ratio equals to 1 when all the switches 7 to 9 are turned off, 2 when only the switch 7 is turned on, 4 when only the switches 7 and 8 are turned on, and 8 when all the switches 7 to 9 are turned on. A solid-state imaging apparatus, in which the amplifying ratio is generally set according to the illuminance of the object, does not require advanced settings, and simple magnification values such as ×1, ×2, ×4, and ×8 are sufficient. Thus, the configuration according to the present embodiment is of much practical use.

Figure 3:
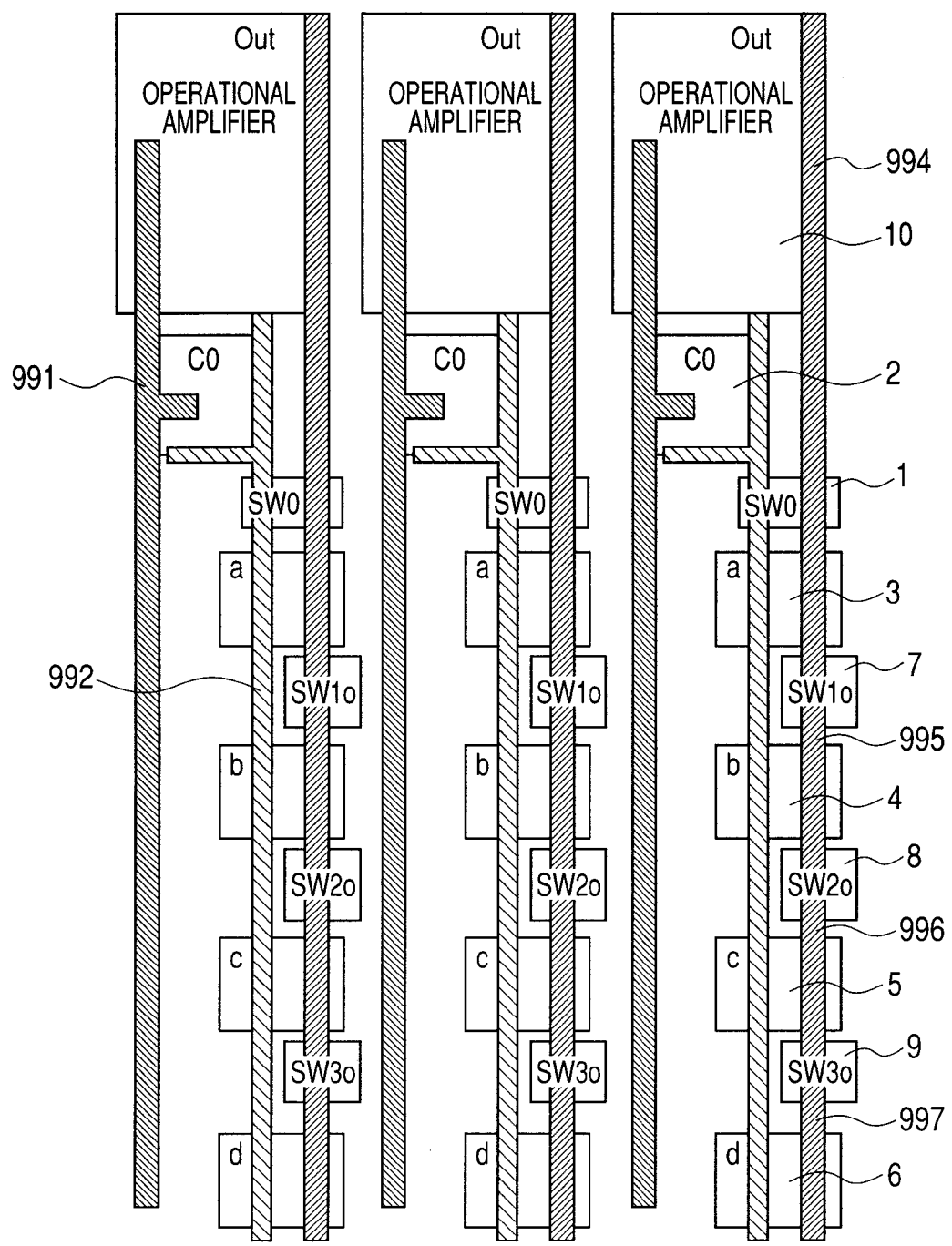
FIG. 3 is a diagram illustrating a circuit layout of the solid-state imaging apparatus in FIG. 2.

FIG. 3 is a diagram illustrating a circuit layout of the solid-state imaging apparatus in FIG. 2. Description of components 1 to 10, which have already been described above, will be omitted. Besides, the input terminal 991 and the negative input terminal 992 of the operational amplifier 10 are shown in FIG. 3. Furthermore, the circuit includes an output terminal 994, an electrode 995 between the switches 7 and 8, an electrode 996 between the switches 8 and 9, and an electrode 997 between the switch 9 and the feedback capacitor 6.

The electrodes 995 to 997 are cut off from the output terminal 994 by the switches 7 to 9, thereby reducing the parasitic capacitance between the negative input terminal 992 and output terminal 994 of the operational amplifier 10. The feedback capacitor in FIG. 2 including the parasitic capacitance is calculated as follows.

In FIG. 2, the capacitance value of the parasitic capacitance 13 is Cp0a, capacitance value of the parasitic capacitance 14 is Cp0b, capacitance value of the parasitic capacitance 15 is Cp0c, and capacitance value of the parasitic capacitance 16 is Cp0d. The capacitance values of the parasitic capacitances 17 to 19 are Cp1 each.

If equivalent capacitance subsequent to the capacitance 15 (Cp0c) is Cxd, Cxd is given by Eq. (1) below.

⟨Expression 1⟩

$$Cxd = \frac{1}{\frac{1}{d + Cp0d} + \frac{1}{Cp1}} \quad (1)$$

Also, if equivalent capacitance subsequent to the capacitance 14 (Cp0b) is Cxc, Cxc is given by Eq. (2) below.

⟨Expression 2⟩

$$Cxc = \frac{1}{\frac{1}{c + Cxd + Cp0c} + \frac{1}{Cp1}} \quad (2)$$

Also, if equivalent capacitance subsequent to the capacitance 13 (Cp0a) is Cxb, Cxb is given by Eq. (3) below.

⟨Expression 3⟩

$$Cxb = \frac{1}{\frac{1}{b + Cxc + Cp0b} + \frac{1}{Cp1}} \quad (3)$$

Thus, the amplifying ratio Gain of the amplifier in FIG. 2 is given by Eq. (4) below.

⟨Expression 4⟩

$$Gain = \frac{C0}{a + Cp0a + Cxb} \quad (4)$$

The capacitance value a of the feedback capacitor 3, capacitance value b of the feedback capacitor 4, capacitance value c of the feedback capacitor 5 and capacitance value d of the feedback capacitor 6, which are larger than the capacitance value Cp1 of the parasitic capacitances 17 to 19, can be approximated as follows.

$$d + Cp0d \gg Cp1$$

$$c + Cxd + Cp0c \gg Cp1$$

$$b + Cxc + Cp0b \gg Cp1$$

When the above relations are plugged into Eqs. (1) to (4), the following relations hold.

$$Cxd \approx Cp1$$

$$Cxc \approx Cp1/2$$

$$Cxb \approx Cp1/3$$

Consequently, Eq. (4) can be simplified into Eq. (5).

⟨Expression 5⟩

$$Gain = \frac{C0}{a + Cp0a + \frac{1}{3}Cp1} \quad (5)$$

From Eq. (5), it can be seen that effects of the parasitic capacitance on the amplifying ratio Gain are reduced. This reduces fluctuations in the amplifying ratio Gain due to manufacturing variations as well as prevents reductions in the amplifying ratio Gain due to parasitic capacitance.

(Second Embodiment)

Figure 4:
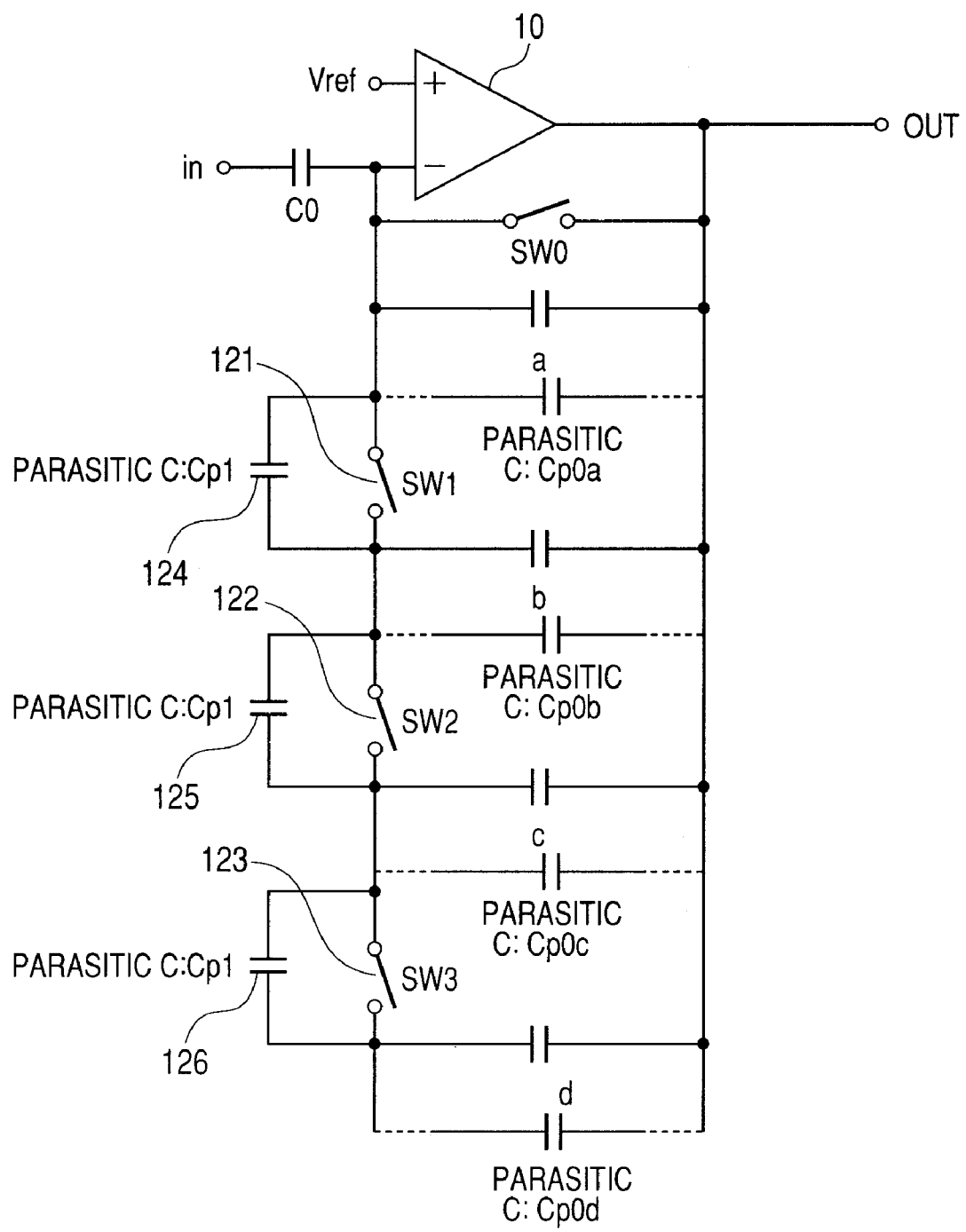
FIG. 4 is a circuit diagram illustrating a configuration example of an amplifier according to a second embodiment of the present invention.

FIG. 4 is a circuit diagram illustrating a configuration example of an amplifier installed in each column of the gain circuit 20 according to a second embodiment of the present invention. The circuit in FIG. 4 is designed by taking parasitic capacitance into consideration. Differences of the present embodiment from the first embodiment will be described below. In FIG. 4, an amplifying ratio changing switch (first switch) SW1 is denoted by 121, amplifying ratio changing switch (second switch) SW2 is denoted by 122, and amplifying ratio changing switch SW3 is denoted by 123. Also, parasitic capacitance of the amplifying ratio changing switch 121, parasitic capacitance of the amplifying ratio changing switch 122, and parasitic capacitance of the amplifying ratio changing switch 123 are denoted by 124, 125 and 126, respectively, where it is assumed that all the parasitic capacitances have a capacitance value of Cp1. The capacitors a, b, c and d have a relationship $a \leq b \leq c \leq d$.

The amplifying ratio changing switch 121 is connected between left terminals of the feedback capacitors a and b. The amplifying ratio changing switch 122 is connected between left terminals of the feedback capacitors b and c. The amplifying ratio changing switch 123 is connected between left terminals of the feedback capacitor c and d. The left terminal of the feedback capacitor a is connected to the negative input terminal of the operational amplifier 10. The negative input terminal of the operational amplifier 10 is connected to the left terminal of the feedback capacitor c via the amplifying ratio changing switches 121 and 122, and to the left terminal of the feedback capacitor d via the amplifying ratio changing switches 121, 122 and 123.

The present embodiment differs from the first embodiment in that the amplifying ratio changing switches 121 to 123 are placed on the input terminal side of the operational amplifier 10. The amplifying ratio calculation formula which takes the parasitic capacitance into consideration is exactly the same as the first embodiment.

According to the present embodiment, since the amplifying ratio changing switches 121, 122 and 123 are installed at a feedback terminal of the operational amplifier 10, potentials at terminals of the amplifying ratio changing switches 121 to 123 do not vary greatly from the potential Vref of the positive input terminal. Therefore, the amplifying ratio changing switches 121 to 123 can be unipolar transistor switches which can transmit a signal voltage close to the potential Vref to both terminals.

Specifically, when supply voltage VDD=5 V and potential Vref=1 V, NMOS transistors can be used as the amplifying ratio changing switches 121, 122 and 123. In the first embodiment, CMOS switches need to be used for the amplifying ratio changing switches 7, 8 and 9, which are installed on the output terminal side of the operational amplifier 10 with large potential fluctuations.

(Third Embodiment)

Figure 5:
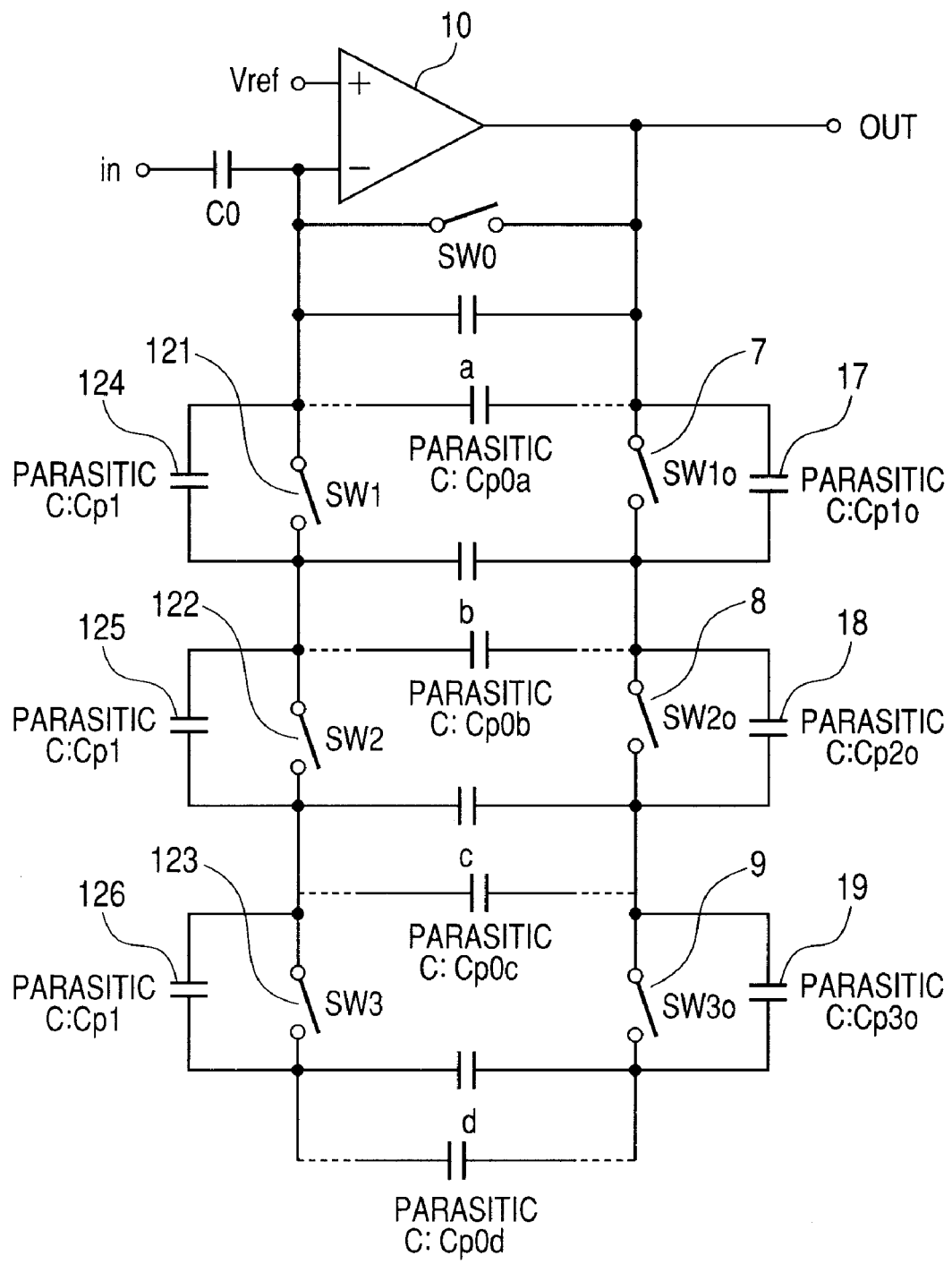
FIG. 5 is a circuit diagram illustrating a configuration example of an amplifier according to a third embodiment of the present invention.

FIG. 5 is a circuit diagram illustrating a configuration example of an amplifier installed in each column of the gain circuit 20 according to a third embodiment of the present invention. The circuit in FIG. 5 is designed by taking parasitic capacitance into consideration. Differences of the present embodiment from the first embodiment will be described below. In the present embodiment, switches are installed on both input terminal side and output terminal side of the operational amplifier 10. Specifically, in addition to the components shown in FIG. 4, switches 7, 8 and 9 are placed on the output terminal side as in the case of the first embodiment. The switch 7 corresponds to the first switch, the switch 8 corresponds to the second switch, the switch 121 corresponds to the third switch, and the switch 122 corresponds to the fourth switch. The reference numerals in FIG. 4 are the same as those described above, and thus description thereof will be omitted.

According to the present embodiment, to maximize the amplifying ratio, the amplifying ratio changing switches 7, 8, 9, 121, 122 and 123 are all turned off. As the parasitic capacitance 17 (Cp1$o$), parasitic capacitance (Cp2$o$) and parasitic capacitance 19 (Cp3$o$) smaller than the feedback capacitors b, c, d are placed in series, the parasitic capacitance produced between the negative input terminal and output terminal of the operational amplifier is reduced still more than in the first and second embodiments. This similarly applies to other amplifying ratio settings.

(Fourth Embodiment)

Figure 6:
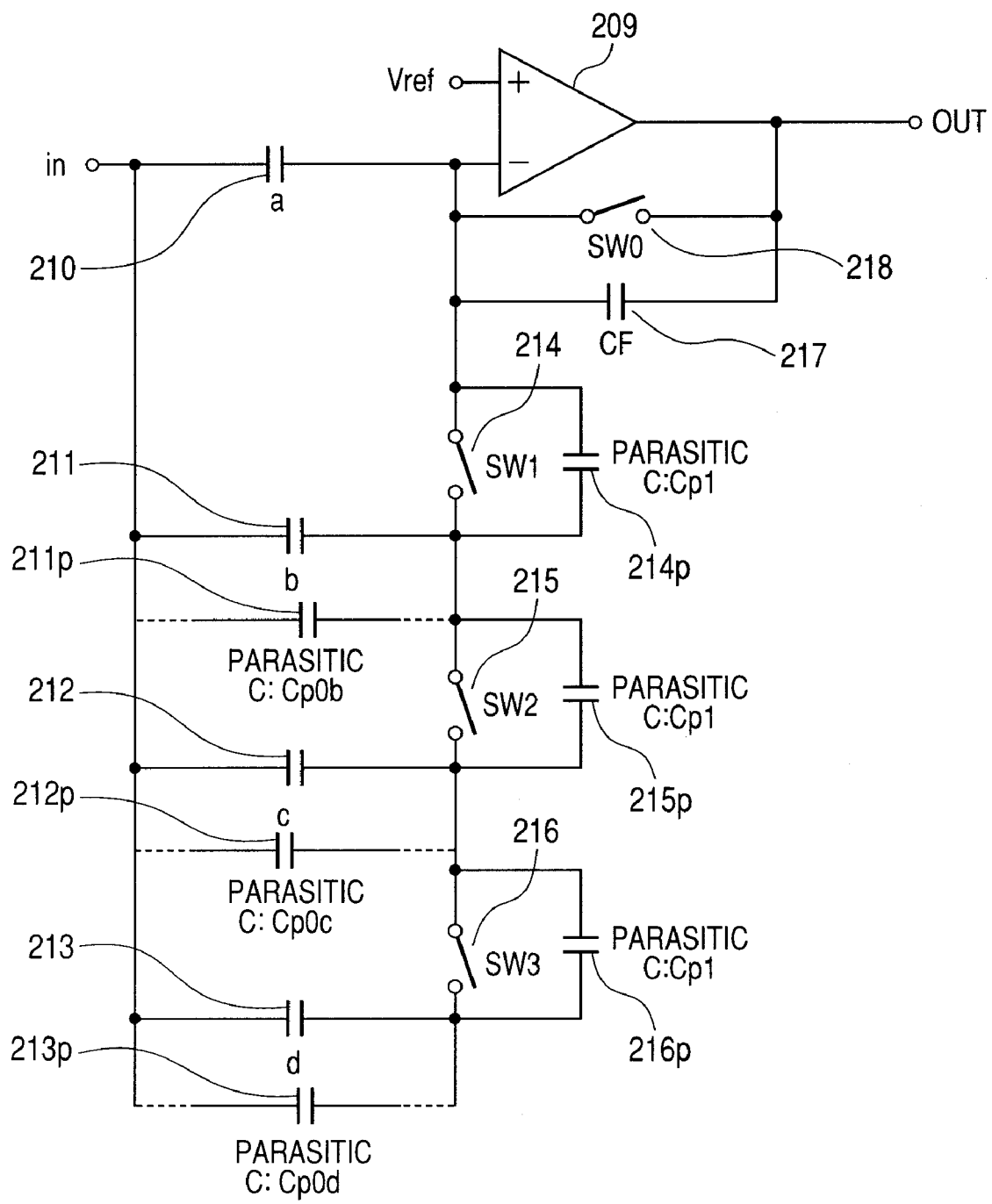
FIG. 6 is a circuit diagram illustrating a configuration example of an amplifier according to a fourth embodiment of the present invention.

FIG. 6 is a circuit diagram illustrating a configuration example of an amplifier installed in each column of the gain circuit 20 according to a fourth embodiment of the present invention. The circuit in FIG. 6 is designed by taking parasitic capacitance into consideration. Differences of the present embodiment from the first embodiment will be described below. In FIG. 6, an operational amplifier is denoted by 209, input capacitor a is denoted by 210, and input capacitor (first capacitor) b is denoted by 211. Also, parasitic capacitance of the input capacitor 211 is denoted by 211$p$, an input capacitor (second capacitor) c is denoted by 212, parasitic capacitance of the input capacitor 212 is denoted by 212$p$, an input capacitor (third capacitor) d is denoted by 213, and parasitic capacitance of the input capacitor 213 is denoted by 213$p$. A first amplifying ratio changing switch SW1, second amplifying ratio changing switch SW2 and third amplifying ratio changing switch SW3 are denoted by 214, 215 and 216, respectively. Furthermore, parasitic capacitance of the amplifying ratio changing switch 214 is denoted by 214$p$, parasitic capacitance of the amplifying ratio changing switch 215 is denoted by 215$p$, and parasitic capacitance of the amplifying ratio changing switch 216 is denoted by 216$p$, where it is assumed that all the parasitic capacitances have a value of Cp1. Besides, a feedback capacitor CF is denoted by 217 and feedback capacitor initializing switch SW0 is denoted by 218.

Of the operational amplifier 209, a positive input terminal accepts input of the potential Vref, a negative input terminal is connected to an input terminal in via the input capacitor 210, and an output terminal is connected to an output terminal OUT. The feedback capacitor initializing switch 218 and feedback capacitor 217 are connected in parallel between the negative input terminal and output terminal of the operational amplifier 209. The input capacitors 210 to 213 are connected in parallel between the input terminal in and the negative input terminal of the operational amplifier 209. The amplifying ratio changing switch 214 is connected between right terminals of the input capacitors 210 and 211. The amplifying ratio changing switch 215 is connected between right terminals of the input capacitors 211 and 212. The amplifying ratio changing switch 216 is connected between right terminals of the input capacitors 212 and 213. The right terminal of the input capacitor 210 is connected to the negative input terminal of the operational amplifier 209. The negative input terminal of the operational amplifier 209 is connected to the right terminal of the input capacitor 212 via the amplifying ratio changing switches 214 and 215, and to the right terminal of the input capacitor 213 via the amplifying ratio changing switches 214, 215 and 216.

Whereas the first, second and third embodiments concern improving the feedback capacitors of the column amplifier, according to the present embodiment, the same concept is applied to the input capacitors. Although a detailed calculation formula is omitted, since the parasitic capacitances can be reduced when the amplifying ratio changing switches 214, 215 and 216 are off, the present embodiment can keep down fluctuations in the amplifying ratio due to manufacturing variations. Also, the present embodiment can reduce effects of noise introduced via the parasitic capacitances.

(Fifth Embodiment)

Figure 7:
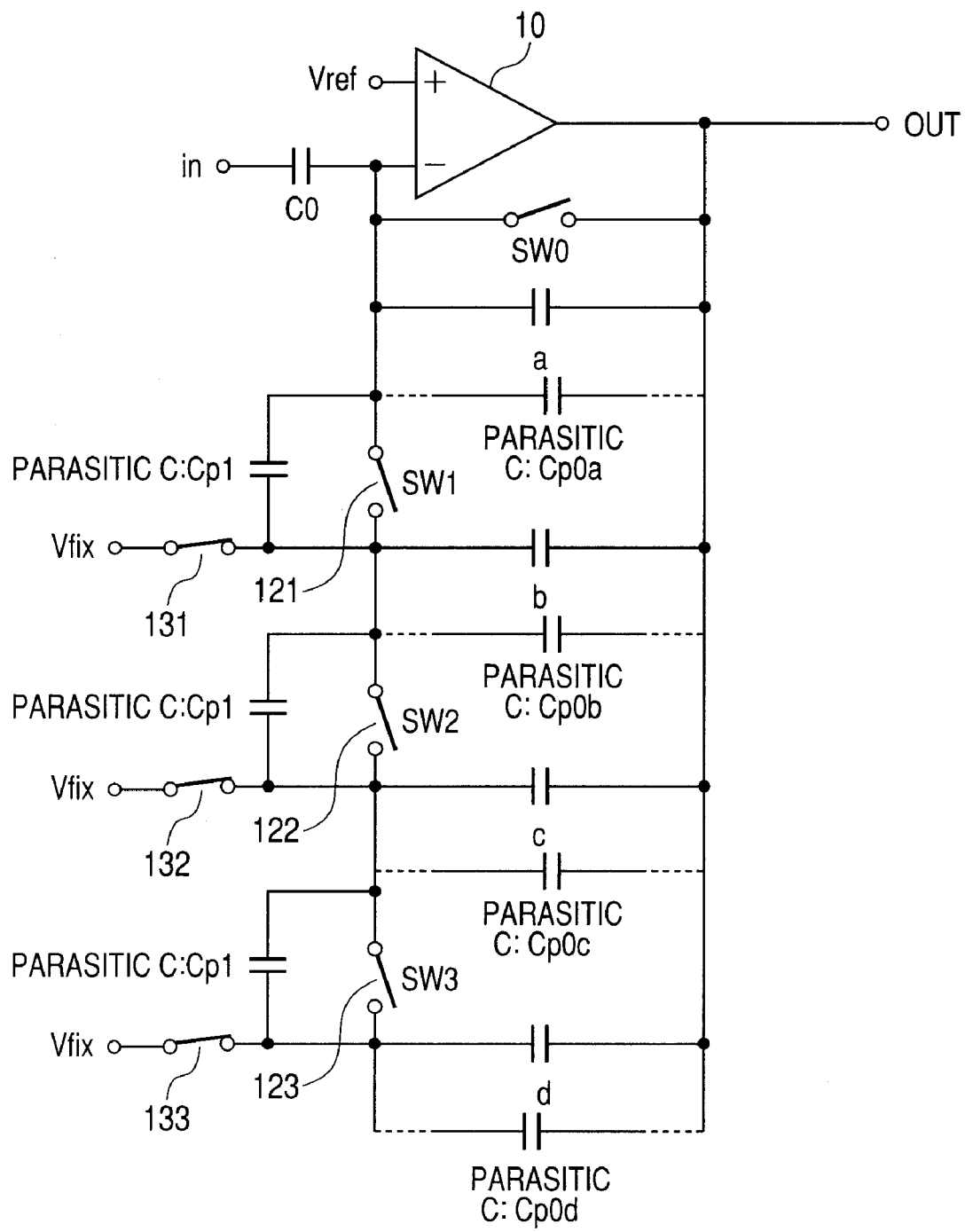
FIG. 7 is a circuit diagram illustrating a configuration example of an amplifier according to a fifth embodiment of the present invention.

FIG. 7 is a circuit diagram illustrating a configuration example of an amplifier installed in each column of the gain circuit 20 according to a fifth embodiment of the present invention. The circuit in FIG. 7 is designed by taking parasitic capacitance into consideration. Differences of the present embodiment from the second embodiment will be described below. The present embodiment is an improved version of the second embodiment (FIG. 4). Switches 131, 132 and 133 are provided to set the amplifying ratio changing switches 121, 122, 123 to a fixed potential Vfix at one terminal.

The switch 131 is a first fixed potential node switch used to connect the left terminal of the feedback capacitor b to a node of a fixed potential Vfix. The switch 132 is a second fixed potential node switch used to connect the left terminal of the feedback capacitor c to a node of the fixed potential Vfix. The switch 133 is a third fixed potential node switch used to connect the left terminal of the feedback capacitor d to a node of the fixed potential Vfix.

Operation will be described briefly. To maximize the amplifying ratio of the operational amplifier 10, the amplifying ratio changing switches 121, 122 and 123 are all turned off. In so doing, the switches 131, 132 and 133 are all turned on. The parasitic capacitance between the negative input terminal and output terminal of the operational amplifier 10 is exactly the same as in the first and second embodiments. However, since the one terminals of the amplifying ratio changing switches 121, 122 and 123—which are in a floating state according to the first and second embodiments—are fixed at the potential Vfix, the effects of noise introduced from outside the circuit can be reduced.

Similarly, to set the feedback capacitor to a+b, the amplifying ratio changing switch 121 is turned on, the amplifying ratio changing switches 122 and 123 are turned off, the switch 131 is turned off, and the switches 132 and 133 are turned on. Consequently, as with the above principle, the fixed potential acts to reduce the effects of noise introduced from outside.

The first to fifth embodiments enable implementing a desired amplifying ratio changing circuit without increasing a layout area of the gain circuit (column amplifier circuit) 20 of the solid-state imaging apparatus. Also, the first to fifth embodiments provide a gain circuit 20 with reduced fluctuations in the amplifying ratio due to manufacturing variations in the thicknesses of metal wiring layers and interlayer insulating films. Furthermore, the first to fifth embodiments provide a gain circuit 20 which is less prone to disturbance introduced via parasitic capacitance.

It should be noted that the embodiments described above merely illustrate concrete examples of carrying out the invention and are not to be interpreted as limiting the true scope of the present invention. That is, the present invention can be implemented in various forms without departing from the technical idea or major features of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-181784, filed Aug. 4, 2009, which is hereby incorporated by reference herein in its entirety.

What is claimed is:

1. A solid-state imaging apparatus comprising:
a pixel including a photoelectric conversion element and outputting a pixel signal; and
an amplifier for amplifying the pixel signal outputted from the pixel, wherein
the amplifier includes
an operational amplifier,
an input capacitor having one terminal connected to an input terminal of the operational amplifier and the other terminal connected to the pixel,
a feedback capacitor connected between the input terminal and an output terminal of the operational amplifier,
an initialization switch connected between the input terminal and the output terminal of the operational amplifier,
a first capacitor connected in parallel to the input capacitor having one terminal connected to one terminal of the input capacitor and the other terminal connected to the other terminal of the input capacitor,
a second capacitor connected in parallel to the input capacitor having one terminal connected to one terminal of the input capacitor and the other terminal connected to the other terminal of the input capacitor,
a first switch and a second switch,
wherein the first switch is arranged between the one terminals of the input capacitor and the first capacitor, and the second switch is arranged between the one terminals of the first and second capacitors,
or the first switch is arranged between the other terminals of the input capacitor and the first capacitor, and the second switch is arranged between the other terminals of the first and second capacitors.

2. The solid-state imaging apparatus according to claim 1, further comprising
a first fixed potential node switch for connecting the one terminal of the first capacitor to a fixed potential node, and
a second fixed potential node switch for connecting the one terminal of the second capacitor to the fixed potential node.

3. A solid-state imaging apparatus comprising:
a pixel including a photoelectric conversion element and outputting a pixel signal; and
an amplifier for amplifying the pixel signal outputted from the pixel, wherein
the amplifier includes
an operational amplifier,
an input capacitor having one terminal connected to an input terminal of the operational amplifier and the other terminal connected to the pixel,
a feedback capacitor connected between the input terminal and an output terminal of the operational amplifier,
an initialization switch connected between the input terminal and the output terminal of the operational amplifier,
a first capacitor connected in parallel to the feedback capacitor having one terminal connected to one terminal of the feedback capacitor and the other terminal connected to the other terminal of the feedback capacitor,
a second capacitor connected in parallel to the feedback capacitor having one terminal connected to the one terminal of the feedback capacitor and the other terminal connected to the other terminal of the feedback capacitor,
a first switch and a second switch connected in series,
wherein the first switch is arranged between the one terminals of the feedback capacitor and the first capacitor, and the second switch is arranged between the one terminals of the first and second capacitors,
or, the first switch is arranged between the other terminals of the feedback capacitor and the first capacitor, and the second switch is arranged between the other terminals of the first and second capacitors.

4. The solid-state imaging apparatus according to claim 3, wherein
the output terminal of the operational amplifier is connected to the one terminal of the second capacitor through the first and second switches.

5. The solid-state imaging apparatus according to claim 3, wherein
the input terminal of the operational amplifier is connected to the one terminal of the second capacitor through the first and second switches.

6. The solid-state imaging apparatus according to claim 3, wherein
the first switch is connected between the one terminal of the feedback capacitor and the one terminal of the first capacitor,
the second switch is connected between the one terminals of the first and second capacitors,
a third switch is connected between the other terminal of the feedback capacitor and the other terminal of the first capacitor, and
a fourth switch is connected between the other terminals of the first and second capacitors.

7. The solid-state imaging apparatus according to claim 3, further comprising
a first fixed potential node switch for connecting the one terminal of the first capacitor to a fixed potential node, and
a second fixed potential node switch for connecting the one terminal of the second capacitor to the fixed potential node.

8. The solid-state imaging apparatus according to claim 3, wherein
the feedback capacitor, the first capacitor, and the second capacitor have capacitances of which values increase in an order of the feedback capacitor, the first capacitor, and the second capacitor.

* * * * *